(12) United States Patent
Breuckmann

(10) Patent No.: US 9,304,751 B2
(45) Date of Patent: Apr. 5, 2016

(54) METHOD FOR LOADING SOFTWARE ONTO A PROCESSOR UNIT OF A SUBCOMPONENT OF AN ARRAY CONSISTING OF A PLURALITY OF COMPONENTS HAVING DIFFERENT SUBCOMPONENTS

(75) Inventor: Christian Breuckmann, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 123 days.

(21) Appl. No.: 14/232,685

(22) PCT Filed: Jun. 20, 2012

(86) PCT No.: PCT/EP2012/061834
§ 371 (c)(1),
(2), (4) Date: Jan. 14, 2014

(87) PCT Pub. No.: WO2013/010744
PCT Pub. Date: Jan. 24, 2013

(65) Prior Publication Data
US 2014/0165052 A1    Jun. 12, 2014

(30) Foreign Application Priority Data

Jul. 15, 2011    (DE) .......................... 10 2011 079 271

(51) Int. Cl.
*G06F 9/44*    (2006.01)
*G06F 9/45*    (2006.01)
(Continued)

(52) U.S. Cl.
CPC .............. *G06F 8/61* (2013.01); *G06F 9/44557* (2013.01); *G06F 9/5044* (2013.01); *G06F 8/456* (2013.01); *G06F 9/30014* (2013.01)

(58) Field of Classification Search
CPC ..... G06F 21/51; G06F 9/445; G06F 9/44521; G06F 9/45525; G06F 9/44557; G06F 8/65; G06F 8/67; G06F 8/441; G06F 8/445; G06F 9/5044; G06F 9/30014; G06F 9/4425; G06F 8/61; G06F 8/456; G06F 8/451
See application file for complete search history.

(56) References Cited

U.S. PATENT DOCUMENTS 5,261,095 A * 11/1993 Crawford .............. G06F 9/4425
712/E9.082
7,039,923 B2 * 5/2006 Kumar .................... G06F 9/445
717/166
(Continued)

FOREIGN PATENT DOCUMENTS

CA    2632509 A1    11/2009
DE    10234304 A1    2/2004
(Continued)

OTHER PUBLICATIONS

Eylon Caspi et al., Stream Computations Organized for Reconfigurable Execution (Score), 2000, [Retrieved on Nov. 25, 2015]. Retrieved from the internet: <URL: http://download.springer.com/static/pdf/622/chp%253A10.10> 10 Pages (605-614).*
(Continued)

*Primary Examiner* — Thuy Dao
*Assistant Examiner* — Anibal Rivera
(74) *Attorney, Agent, or Firm* — Laurence Greenberg; Werner Stemer; Ralph Locher

(57) ABSTRACT

A method for loading software onto a processor unit of a subcomponent of an assembly that contains a plurality of components having different subcomponents. The assembly includes a central processor. In order to be able to carry out at least a portion of such a method automatically, subcomponent-specific structure information is selected from a stored subcomponent-specific structure information list about the component by way of stored base information about the respective component, on the basis of a component-specific structure information list about the assembly stored in the central processor, and by way of additional stored base information about the subcomponent. The selected subcomponent-specific structure information is then used to generate, via the subcomponent, a loading list which causes the software to be loaded onto the processor unit that belongs to the subcomponent.

4 Claims, 2 Drawing Sheets

(51) Int. Cl.
*G06F 9/445* (2006.01)
*G06F 7/38* (2006.01)
*G06F 15/16* (2006.01)
*G06F 9/50* (2006.01)
*G06F 9/30* (2006.01)

(56) References Cited

U.S. PATENT DOCUMENTS

| | | | | |
|---|---|---|---|---|
| 7,415,703 | B2* | 8/2008 | Aguilar, Jr. | G06F 9/44557 709/201 |
| 7,506,335 | B1* | 3/2009 | Wooff | G06F 8/61 717/173 |
| 7,748,006 | B2* | 6/2010 | Aguilar, Jr. | G06F 9/44557 709/201 |
| 8,250,174 | B2 | 8/2012 | Von Stein et al. | |
| 2004/0088697 | A1* | 5/2004 | Schwartz | G06F 8/61 717/174 |
| 2004/0215942 | A1* | 10/2004 | Hansen | G06F 9/30014 712/235 |
| 2005/0086655 | A1* | 4/2005 | Aguilar, Jr. | G06F 9/44557 717/176 |
| 2008/0235679 | A1* | 9/2008 | Aguilar | G06F 9/44557 717/174 |
| 2008/0271003 | A1* | 10/2008 | Minor | G06F 9/5044 717/151 |
| 2009/0259996 | A1* | 10/2009 | Grover | G06F 8/456 717/136 |
| 2010/0325627 | A1* | 12/2010 | Lafaye | G06F 8/65 717/177 |
| 2012/0060145 | A1* | 3/2012 | Schloegel | G06F 8/451 717/107 |

FOREIGN PATENT DOCUMENTS

| | | |
|---|---|---|
| EP | 1260886 A2 | 11/2002 |
| EP | 1431898 A2 | 6/2004 |

OTHER PUBLICATIONS

Tien-Fu Chen et al., A Performance Study of Software and Hardware Data Prefetching Schemes, 1994 IEEE, [Retrieved on Nov. 25, 2015]. Retrieved from the internet: <URL: http://ieeexplore.ieee.org/stamp/stamp.jsp?tp=&arnumber=288147> 10 Pages (223-232).*

* cited by examiner

METHOD FOR LOADING SOFTWARE ONTO A PROCESSOR UNIT OF A SUBCOMPONENT OF AN ARRAY CONSISTING OF A PLURALITY OF COMPONENTS HAVING DIFFERENT SUBCOMPONENTS

BACKGROUND OF THE INVENTION

Field of the Invention

The invention relates to a method for loading software onto a processor unit of a subcomponent of an array consisting of a plurality of components having different subcomponents, said array comprising a central processor.

Such a method is used, for example, in a rail vehicle as array when this represents a passenger train with a central powered car and two end cars; the powered car and the end cars form the components of the array, and doors, toilets and brakes etc. form subcomponents of the components or cars of the passenger train. In order to be able to install or maintain the software for the various components and subcomponents of the rail vehicle, a so-called software administrator has previously assembled a list of the software versions to be installed. If there is a rail vehicle in various variants, for example with a different number of cars, different equipment or other characteristics, different lists for each of these variants are created or corresponding dependencies or notes for the software installation are inserted into a start list.

These lists form the basis for loading the corresponding software for various components of the rail vehicle or for a test whether the relevant software is loaded in each case. These loading or test processes must be performed in each case individually by themselves which demands great attention from the acting persons. These processes are, therefore, time consuming and can result in errors. For this reason, a tedious final test must be performed.

BRIEF SUMMARY OF THE INVENTION

The invention is based on the object of creating a remedy for this and to propose a method by means of which the software loading processes described above can be performed at least partially in an automated manner.

To achieve this object, a subcomponent-specific structure information item is selected from a stored subcomponent-specific structure information list about the component by means of stored respective base information about the component in a method of the type specified initially, according to the invention, on the basis of a component-specific structure information list about the array stored in the central processor by means of further stored base information about the subcomponent; the selected subcomponent-specific structure information about the subcomponent is then used to generate a loading list effecting the software loading of the processor unit that belongs to the subcomponent.

The essential advantage of the method according to the invention consists in that, by using the structure information, the respective loading list for the processor units of the subcomponents and thus the loading of the processor units takes place largely automatically as a result of which the time expended for this is reduced and the loading processes proceed considerably more reliably than previously. Although the structure information list must be created by the software administrator, they are a component of the software and no longer need to be kept available externally. The suitable structure information lists are thus part of the respective software so that there can be no confusion with respect to the various embodiments of array software.

It is also advantageous that during the software loading, stored base information of the components and subcomponents is utilized in support which leads to a further increase in the reliability during the software loading.

In the method according to the invention, the structure information lists advantageously contain structure-describing and/or topological data of the array. The array and its variants are characterized by this means; they also contain target specifications for the software loading of the individual components of the array and for the different variants of the array. The structure information can also be used by itself, for example as specifications and decision-making aid for tests.

In the method according to the invention, the base information can be stored in various ways. Thus, it may be advantageous to store the base information in the processor units and call it up from there.

However, it may also be of advantage if the base information is stored in the central processor.

Special advantages are also obtained if, as array, a rail vehicle having a plurality of cars is used, as components cars of the rail vehicle are used and as subcomponents constructional units of the cars are used.

BRIEF DESCRIPTION OF THE SEVERAL VIEWS OF THE DRAWING

In further explanation of the method according to the invention.

DESCRIPTION OF THE INVENTION

Figure 1:
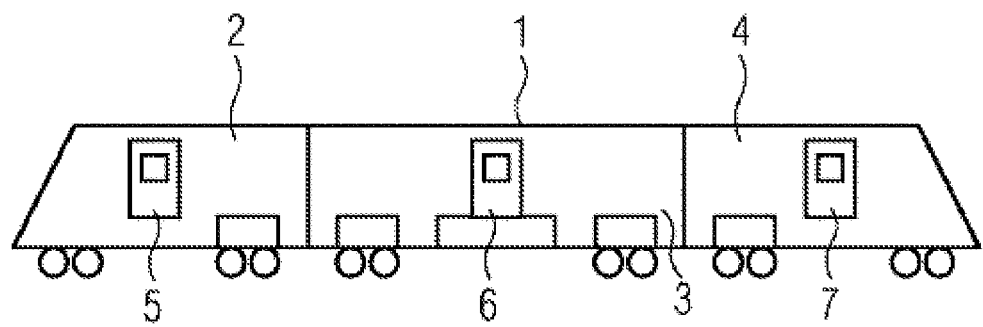
FIG. 1 shows diagrammatically a rail vehicle as exemplary embodiment of an array suitable for performing the method according to the invention and FIG. 2 shows a flow chart of an embodiment of the method according to the invention.

The array 1 shown in FIG. 1 is a rail vehicle having three components in the form of a first car 2 as end car, a second car 3 as powered car and a third car 4 as further end car. Each of the components or cars, respectively, 2 to 4 is provided with, among other things, in each case two subcomponents in the form of a left door 5 and a right door, not recognizable, a left door 6 and a right door, not visible, and a left door 7 and a right door, not shown. To each of the doors 5 to 7, a processor unit is in each case allocated which are not shown in FIG. 1. A central processor of the array 1 or of the rail vehicle, respectively, is also not shown.

Figure 2:
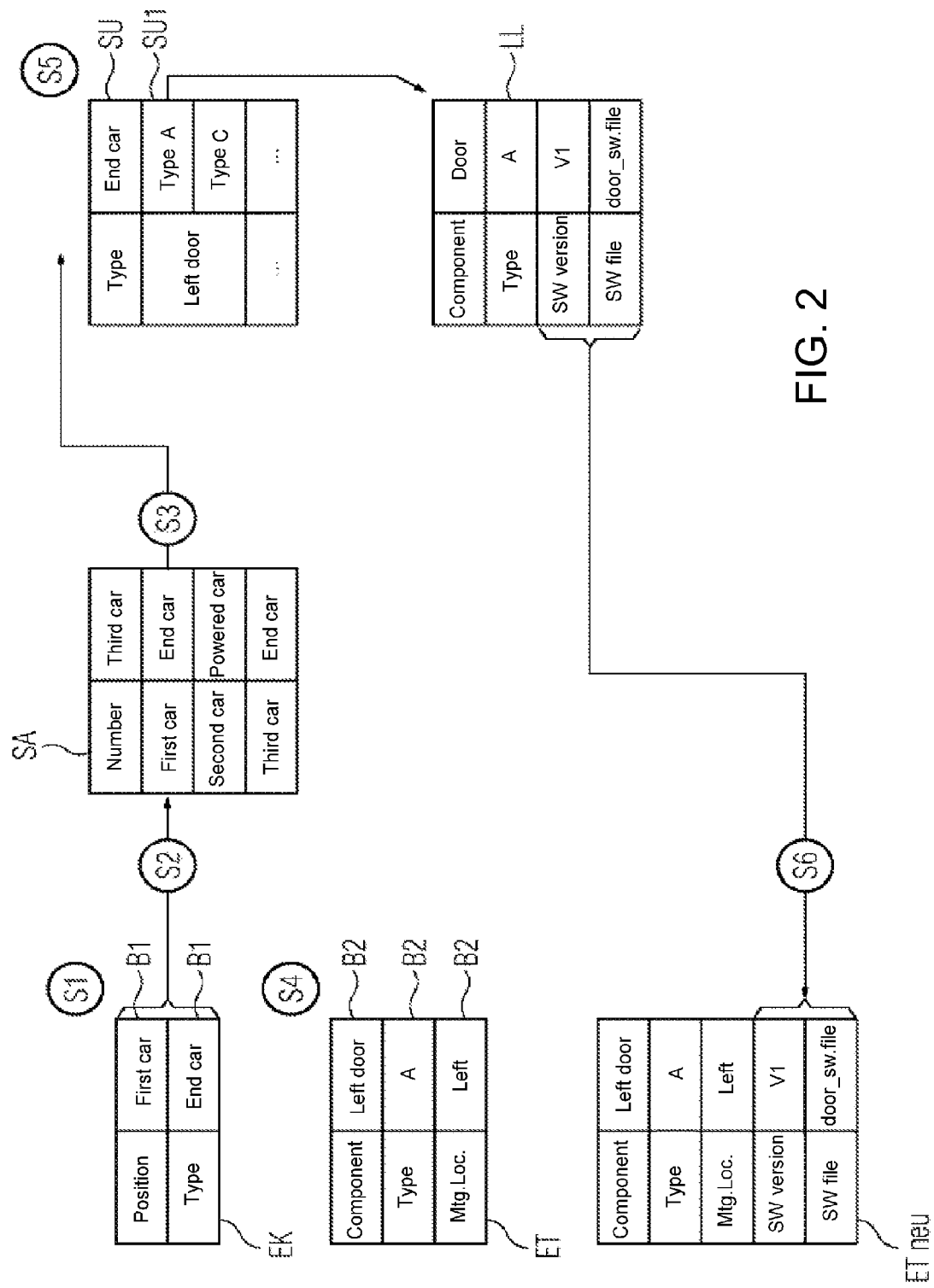

If, for example, the processor unit of the subcomponent or left door 5 is to be loaded with current software, for example, the entry "first car" is made under "position" and the entry "end car" is made under "type" on a monitor, not shown, in a display EK "characteristics of the component" in a first step S1 according to FIG. 2, and thus base information B1 of the component 1 is stored as basic installation. Following this, the second line is activated with structure data for a first car as end car in a component-specific structure information list SA "structure information array" previously formed, in a second step S2, and thus a subcomponent-specific structure information list SU "structure information end car" is called up in a third step S3.

In addition, the entry "A" is carried out in a further display ET "characteristics left door" after "type" in a fourth step S4 and stored as further base information B2 as additional basic installation. In a fifth step, the subcomponent "left door" is sought in the subcomponent-specific structure information list SU and it is tested whether the door is of type "A"; a subcomponent-specific structure information SU1 is thus selected. Underneath, the reference for a loading list LL for a door of type "A" is contained. In the present example, this loading list LL contains the current software version V1 and an installation file "door_sw.file". In a sixth step S6, the installation file "door_sw.file" is installed on the processor unit for the left door 5 of the first car 2 and the processor unit is equipped with the software version V1; this can be displayed in a representation ETnew. By this means, it can then also be easily checked whether the loading of the processor unit has occurred correctly. The subcomponent 5 is thus updated with new software without needing for this purpose an external loading list with notes and comments.

It should be pointed out additionally that by means of the method according to the invention, alternatives for a subcomponent can also be dealt with. For this purpose, FIG. 2 shows in the right-hand-top block there can also be a left door of type C; if this door is to be selected, the letter "C" must be entered under "type" in step S4.

Finally, it should also be noted that the invention cannot be applied only to rail vehicles having a number of cars but also generally with plants or machines configured to be structured. If, for example, a machine has a number of almost identical components and there are in each case similar but still different subcomponent with associated processor unit for these components, the respective loading list can also be produced for the various variants of the machine or of the various subcomponents for the processor units of the subcomponents largely automatically.

The invention claimed is:

1. A processor-executed method of loading software onto an array, the method comprising:

providing the array having a central processor and a plurality of array components, each array component having subarray components of different subarray component types, the subarray components including at least a processor unit;

selecting one array component in the plurality of array components and providing stored base information about the selected array component;

selecting one subarray component type and providing stored base information about the selected subarray component type;

providing an array component specific structure information list about the array, the array component specific structure information list being stored in the central processor and including information specific to the array component of the plurality of array components;

calling up a stored subarray component-specific structure information list about the selected array component on a basis of the base information about the selected array component and on a basis of the array component specific structure information list, the subarray component-specific structure information list including information specific to the subarray components of the selected array component;

selecting a subarray component-specific structure information from the subarray component-specific structure information list on a basis of the base information about the selected subarray component type;

generating a loading list on a basis of the selected subarray component-specific structure information; and effecting, according to the loading list, a loading of the software onto the processor unit that belongs to a subarray component disposed in the selected array component and being of the selected subarray component type.

2. The method according to claim 1, wherein the structure information contains at least one or both of structure-describing data or topological data of the assembly.

3. The method according to claim 1, which comprises storing the base information in the processor units.

4. The method according to claim 1, which comprises storing the base information in the central processor.

* * * * *